(12) United States Patent
Hawang

(10) Patent No.: US 7,413,367 B2
(45) Date of Patent: Aug. 19, 2008

(54) COMBINATIONAL COMMODITY ENGAGING UNIT

(75) Inventor: James Hawang, Taipei (TW)

(73) Assignee: Kenmark Industrial Co., Ltd., Taipei (TW)

( * ) Notice: Subject to any disclaimer, the term of this patent is extended or adjusted under 35 U.S.C. 154(b) by 0 days.

(21) Appl. No.: 11/581,417

(22) Filed: Oct. 17, 2006

(65) Prior Publication Data

US 2008/0089742 A1  Apr. 17, 2008

(51) Int. Cl.
*F16B 12/36* (2006.01)
(52) U.S. Cl. .................. 403/297; 403/240; 403/243; 403/403; 403/408.1; 403/DIG. 12; 411/46; 411/48
(58) Field of Classification Search .......... 403/231, 403/240, 243, 297, 403, 408.1, DIG. 11, 403/DIG. 12, DIG. 13; 411/45, 46, 47, 48
See application file for complete search history.

(56) References Cited

U.S. PATENT DOCUMENTS

| | | | | |
|---|---|---|---|---|
| 3,007,364 A | * | 11/1961 | Dickie | 411/46 |
| 5,211,519 A | * | 5/1993 | Saito | 411/45 |
| 5,902,083 A | * | 5/1999 | Hwang | 411/48 |
| 6,048,147 A | * | 4/2000 | Arisaka et al. | 411/48 |
| 6,406,235 B1 | * | 6/2002 | Bantle | 411/45 |
| 6,454,503 B1 | * | 9/2002 | Polic et al. | 411/45 |
| 6,540,461 B1 | * | 4/2003 | Hawang | 411/48 |

* cited by examiner

*Primary Examiner*—Michael P Ferguson
(74) *Attorney, Agent, or Firm*—Bacon & Thomas, PLLC

(57) ABSTRACT

A combinational commodity engaging unit which can connect by engaging plates of a computer desk, a TV cabinet etc. in order to assemble the combinational commodity without using an auxiliary tool, the engaging unit includes at least: a fixing seat embedded in a first plate, a hollow engaging member embedded in a second plate and having its bottom portion engaged in the fixing seat, and a fixing rod extended into the interior of the hollow engaging member to maintain the hollow engaging member in a state of engaging the fixing seat. By combination of the above stated fixing seat, hollow engaging member and fixing rod, the combinational commodity can be assembled without using an auxiliary tool.

6 Claims, 8 Drawing Sheets

COMBINATIONAL COMMODITY ENGAGING UNIT

BACKGROUND OF THE INVENTION

1. Field of the Invention

The present invention relates to a combinational commodity engaging unit, and especially to such a unit which can connect by engaging plates of a computer desk, a TV cabinet etc. in order to assemble a combinational commodity without using an auxiliary tool.

2. Description of the Prior Art

Markets have been being located everywhere to make customers enjoy the fun and achievement of do it yourself DIY combination; hence there have been various combinational commodities such as computer desks, TV cabinets etc. for promotion on shelves for customers to do DIY combination. In assembling these combinational commodities, normally screws are screwed in or wooden dowels are hammered in to connect a top plate with a supporting side plate.

However, no matter the way of screwing in screws or hammering in wooden dowels to assemble a combinational commodity is used, during the process of assembling by a customer himself, he needs a tool such as a screw driver or hammer etc., for instance: he shall exert force to screw in screws or hammer in wooden dowels, this is energy consumptive and is inconvenient as well to the customer.

And more, plates on a combinational commodity mostly are highly compacted plates or wooden plates; when these plates are tightened for connecting by screwing in screws, they are subjected to making their screw holes get broken screw threads; this not only renders the commodity hard to be assembled firmly, but also renders the same unable to be repeatedly assembling and disassembling.

In view of this, the inventor of the present invention provides an engaging unit which is assembled by engaging, in order to assemble a combinational commodity without using an auxiliary tool.

SUMMARY OF THE INVENTION

The present invention provides a combinational commodity engaging unit which can connect by engaging plates of a computer desk, a TV cabinet etc. in order to assemble the combinational commodity without using an auxiliary tool.

Particularly, the engaging unit is connected to a combinational commodity (e.g. a TV cabinet) by engaging a first plate (e.g. a side plate of the TV cabinet) with a second plate (e.g. a top plate of the TV cabinet), it includes at least: a fixing seat embedded in the first plate, a hollow engaging member embedded in the second plate and having its bottom portion engaged in the fixing seat, and a fixing rod extended into the interior of the hollow engaging member to maintain the hollow engaging member in a state of engaging the fixing seat.

The fixing seat is embedded in a fixing hole of the first plate and has a connecting bottom portion having a function of reversing proofing and has a top portion with an engaging hole; the engaging hole is provided therein with an engaging groove of which the inner radius is larger than the inner radius of the engaging hole.

The hollow engaging member is embedded in a through hole of the second plate; and includes a head embeddable in the through hole, a protruding shaft beneath the head and capable of extending through and out of the through hole, and a central passage extending through the head and the protruding shaft. Wherein the protruding shaft can be embedded in an engaging hole of the fixing seat and has on its outer wall a protruding elastic positioning portion; when the head of the hollow engaging member is embedded in the through hole of the second plate and the protruding shaft is extended through the through hole to embed in the engaging hole of the fixing seat, the elastic positioning portion can be elastically engaged in the engaging groove; and thereby the first plate forms a temporarily fixing state on the second plate.

The fixing rod includes a stem and a rod head, the stem can be extended into the central passage in the interior of the hollow engaging member, the outer surface of the stem of the fixing rod is tapered down from above, the bottom of the fixing rod has a protruding portion with a diameter in coincidence with the inner diameter of the central passage of the hollow engaging member; when the fixing rod is extended into the central passage of the hollow engaging member, the protruding portion is in the central passage at a level equal to that of the elastic positioning portion, and is tightly abutted on the inner wall of the central passage, so that the elastic positioning portion is maintained in the state of being engaged in the engaging groove against inwardly contracting, and thereby the hollow engaging member and the fixing seat are maintained in the state of engaging with each other. Thereby the hollow engaging member and the fixing seat can be firmly connected to each other; by mutual connecting and engaging of the above stated fixing seat, hollow engaging member and fixing rod, the first plate can be completely combined with the second plate.

Further, the central passage of the above stated hollow engaging member is provided on the lateral side of its top with at least a guiding portion, correspondingly, the rod head of the fixing rod is provided with a guiding protrusion; when the fixing rod is rotated, the guiding protrusion is raised along the guiding portion to move up the fixing rod, thereby the stem of the fixing rod is released from abutting on the wall of the central passage inside of the elastic positioning portion, so that the hollow engaging member restores its original state to have the elastic positioning portion elastically engaged in the engaging groove of the fixing seat.

When the combinational commodity is to be disassembled to render the fixing rod to move upwards, by virtue that the hollow engaging member and the fixing seat are in a state of mutually elastically engaging, the hollow engaging member can be pulled upwards, thereby the elastic positioning portion is compressed inwards to be released from the fixing seat, and the first plate can be separated from the second plate.

As compared with the conventional technique, the technical measure of the present invention at least has the following advantages:

1. By mutual connecting and engaging of the fixing seat, hollow engaging member and fixing rod, the first plate can be fast and completely combined with the second plate to fast assemble the combinational commodity without using an auxiliary tool.
2. When the combinational commodity is necessary to be dismantled, this can be done easily by separating the first plate from the second plate without damaging the combinational commodity.

The present invention will be apparent after reading the detailed description of the preferred embodiment thereof in reference to the accompanying drawings.

DETAILED DESCRIPTION OF THE PREFERRED EMBODIMENT

Figure 1:
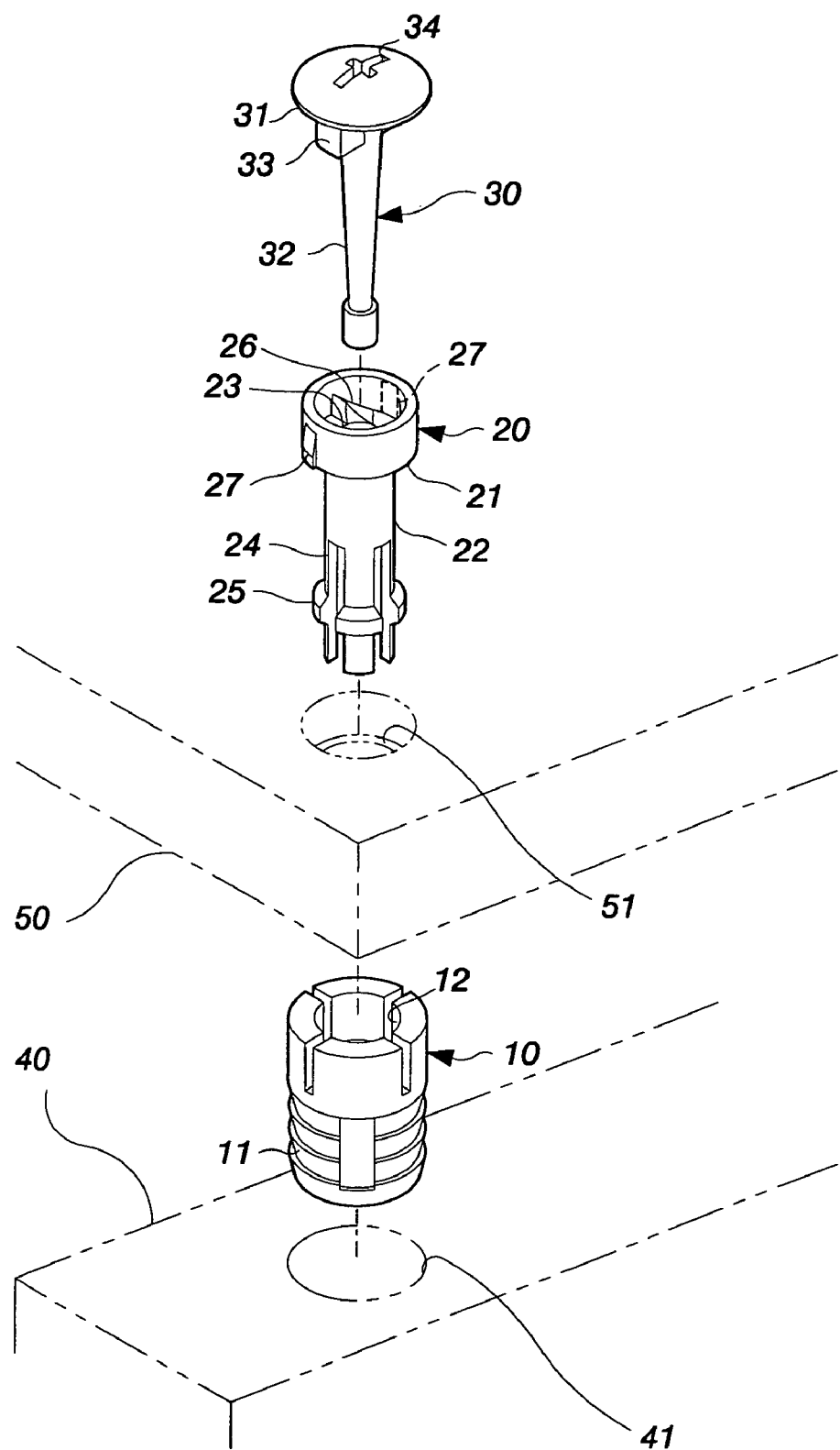
FIG. 1 is an anatomic perspective view showing an embodiment of the present invention.
Figure 2:
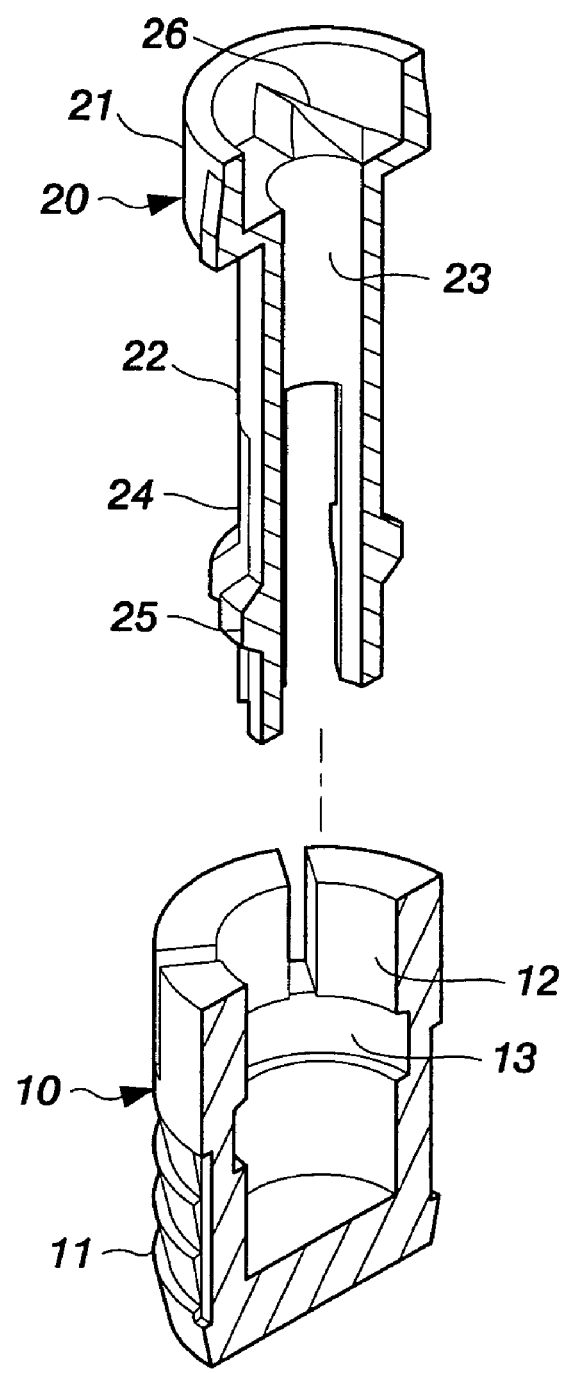
FIG. 2 is a sectional perspective view showing the structure of the present invention.

Referring to FIGS. 1 and 2, the present invention comprises mainly a fixing seat 10, a hollow engaging member 20 and a fixing rod 30. Wherein the present invention is connected to a combinational commodity (e.g. a TV cabinet) by engaging a first plate 40 (e.g. a side plate of the TV cabinet) with a second plate 50 (e.g. a top plate of the TV cabinet), in order to assemble the combinational commodity without using an auxiliary tool.

Wherein the fixing seat 10 is embedded in a fixing hole 41 of the first plate 40 and has a connecting bottom portion 11 having a function of reversing proofing and has a top portion with an engaging hole 12; the engaging hole 12 is provided therein with an engaging groove 13 of which the inner radius is larger than the inner radius of the engaging hole 12.

The hollow engaging member 20 is embedded in a through hole 51 of the second plate 50, and includes a head 21 embeddable in the through hole 51, a protruding shaft 22 beneath the head 21 and capable of extending through and out of the through hole 51, and a central passage 23 extending through the head 21 and the protruding shaft 22. Wherein the protruding shaft 22 can be embedded in an engaging hole 12 of the fixing seat 10 and has on its outer wall a plurality of slits 24 and a protruding elastic positioning portion 25, when the head 21 of the hollow engaging member 20 is embedded in the through hole 51 of the second plate 50 and the protruding shaft 22 is extended through the through hole 51 to embed in the engaging hole 12 of the fixing seat 10, the elastic positioning portion 25 can be elastically engaged in the engaging groove 13; and thereby the first plate 40 forms a temporarily fixing state on the second plate 50.

The fixing rod 30 includes a rod head 31 and a stem 32, the stem 32 can be extended into the central passage 23 in the interior of the hollow engaging member 20 the outer surface of the stem 32 of the fixing rod 30 is tapered down from above, the bottom of the fixing rod 30 has a protruding portion 321 with a diameter in coincidence with the inner diameter of the central passage 23 of the hollow engaging member 20; when the fixing rod 30 is extended into the central passage 23 of the hollow engaging member 20, the protruding portion 321 is in the central passage 23 at a level equal to that of the elastic positioning portion 25, and is tightly abutted on the inner wall of the central passage 23, so that the elastic positioning portion 25 is maintained in the state of being engaged in the engaging groove 13 against inwardly contracting, and thereby the hollow engaging member 20 and the fixing seat 10 are maintained in the state of engaging with each other by mutual connecting and engaging of the above stated fixing seat 10, the hollow engaging member 20 and the fixing rod 30, the first plate 40 can be completely combined with the second plate 50.

Figure 3:
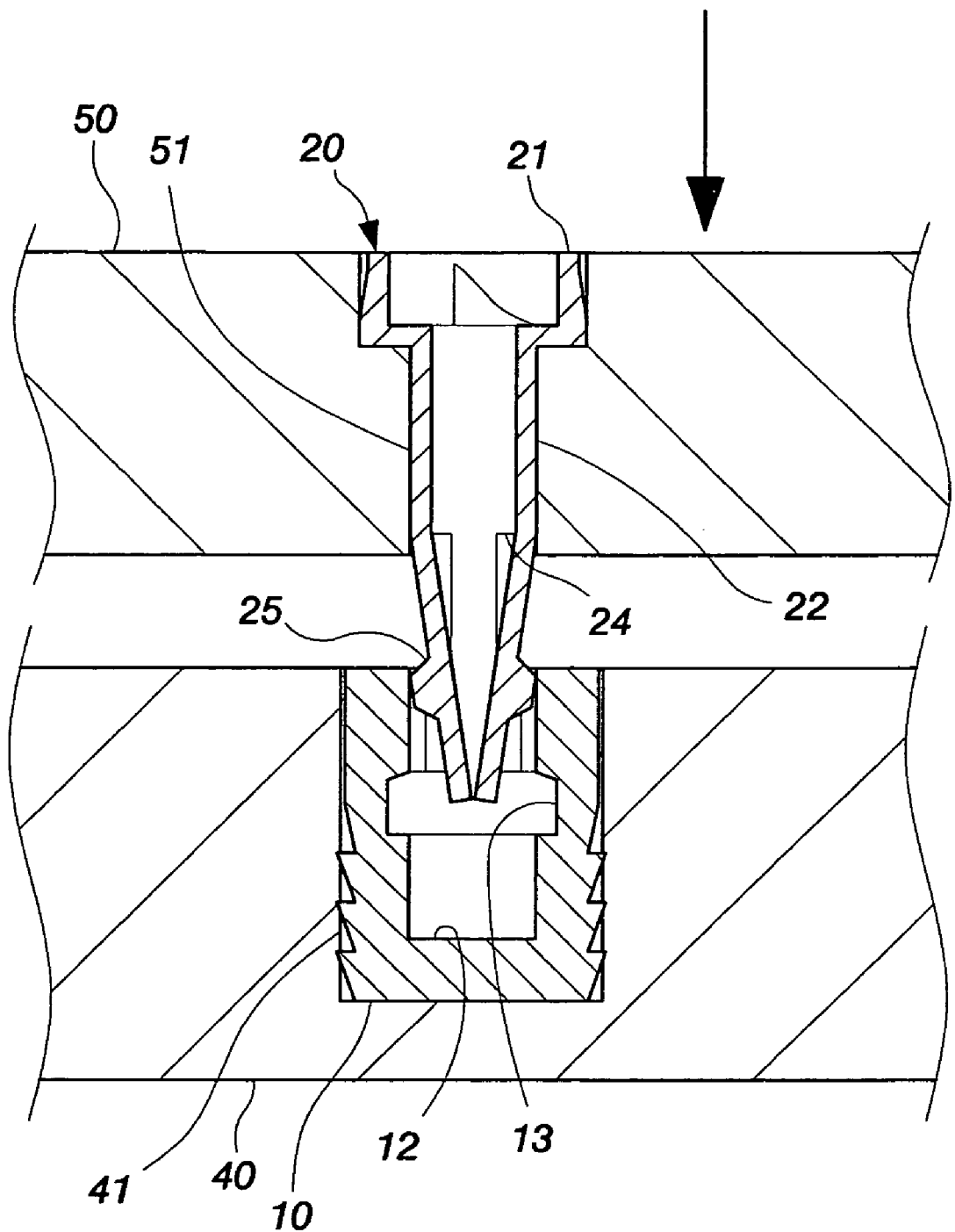
FIG. 3 is a sectional schematic view showing a protruding shaft being embedded in an engaging hole in assembling the embodiment of the present invention.
Figure 4:
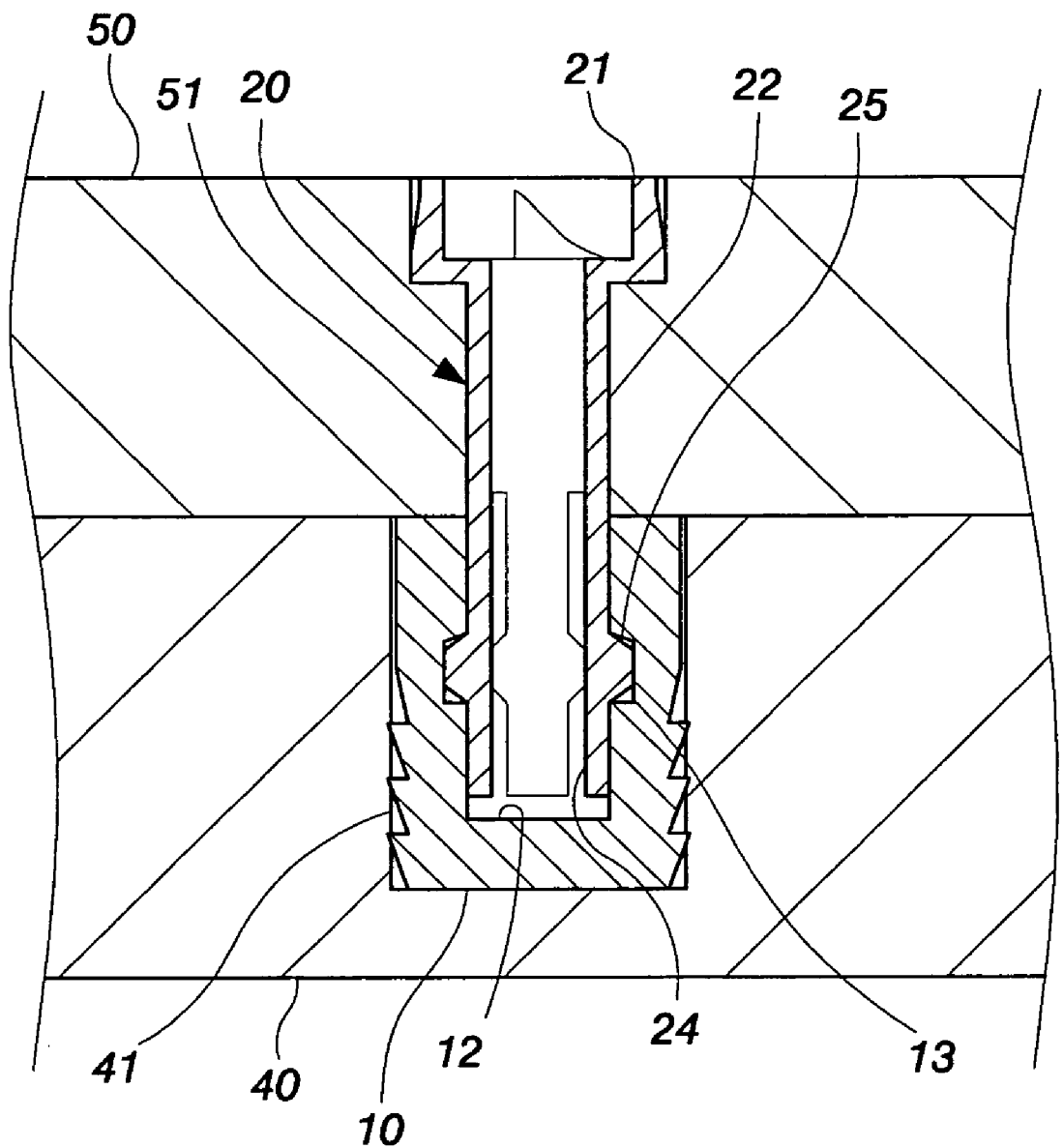
FIG. 4 is a sectional schematic view showing the protruding shaft being embedded in the engaging hole and engaging in an engaging groove in assembling the embodiment of the present invention.

As shown in FIGS. 3 and 4, with the above stated structure, when a user is to connect the first plate 40 with the second plate 50, the fixing seat 10 is in the first place embedded in the fixing hole 41 of the first plate 40, then the second plate 50 is stacked over the first plate 40, and the head 21 of the hollow engaging member 20 is embedded in the through hole 51 to render the protruding shaft 22 to be extended through the through hole 51 and inserted into the engaging hole 12 of the fixing seat 10, by engaging of the elastic positioning portion 25 with the engaging groove 13, the first plate 40 forms a temporarily fixing state on the second plate 50.

In the above process of assembling, after the hollow engaging member 20 is extended through the through hole 51, the bottom end of the protruding shaft 22 is extended into the engaging hole 12 of the fixing seat 10; by virtue that the protruding shaft 22 has on its outer wall the plural slits 24, a space for compression is provided to allow compression against the elastic positioning portion 25 when the latter is abutted against the wall of the engaging hole 12, hence the elastic positioning portion 25 normally with a larger outer radius can pass through the engaging hole 12 with a smaller inner radius, till the elastic positioning portion 25 reaches the position of the engaging groove 13 to be elastically engaged in the latter.

Figure 5:
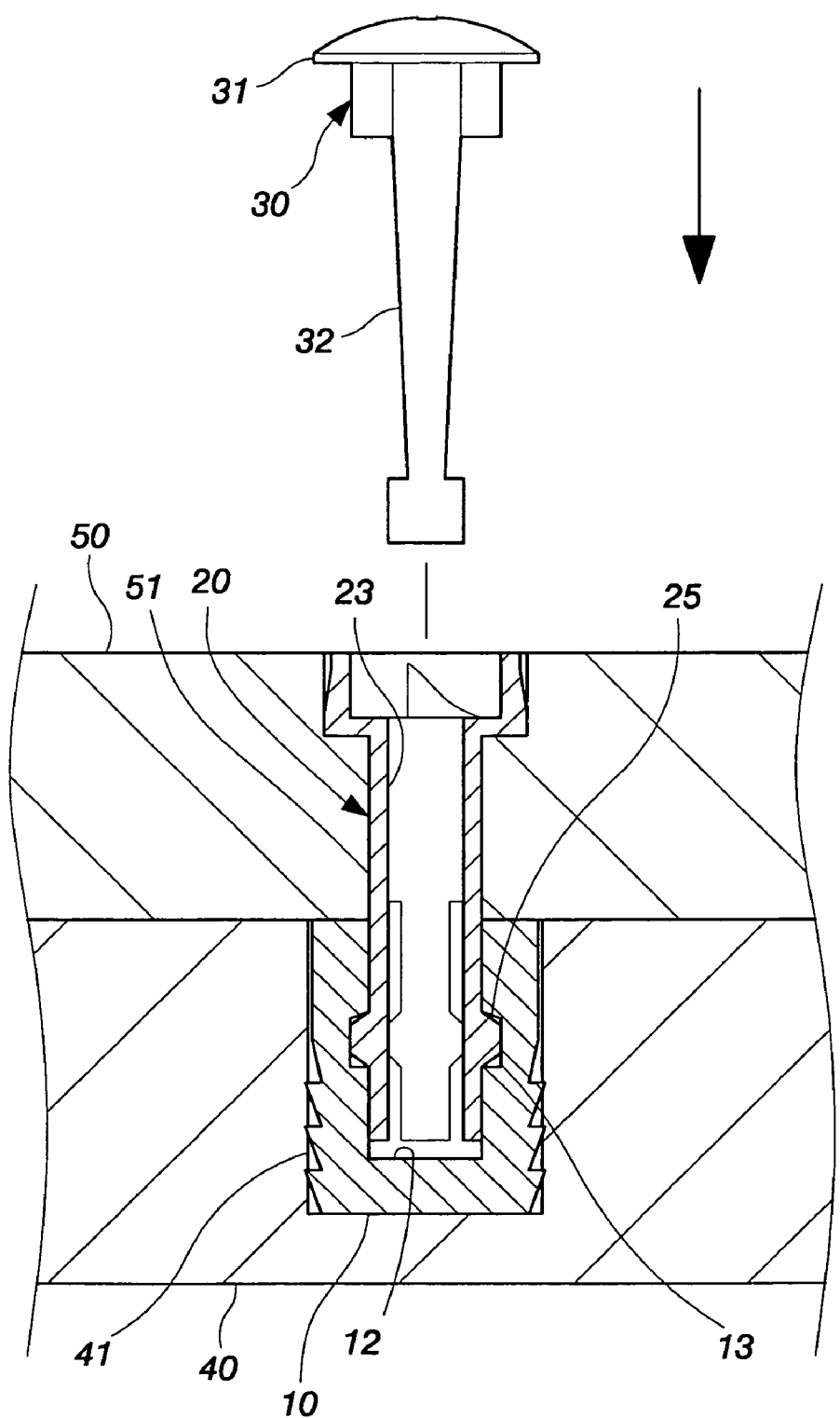
FIG. 5 is a sectional schematic view showing a stem of a fixing rod being extended into a central passage in the interior of a hollow engaging member in assembling the embodiment of the present invention.
Figure 6:
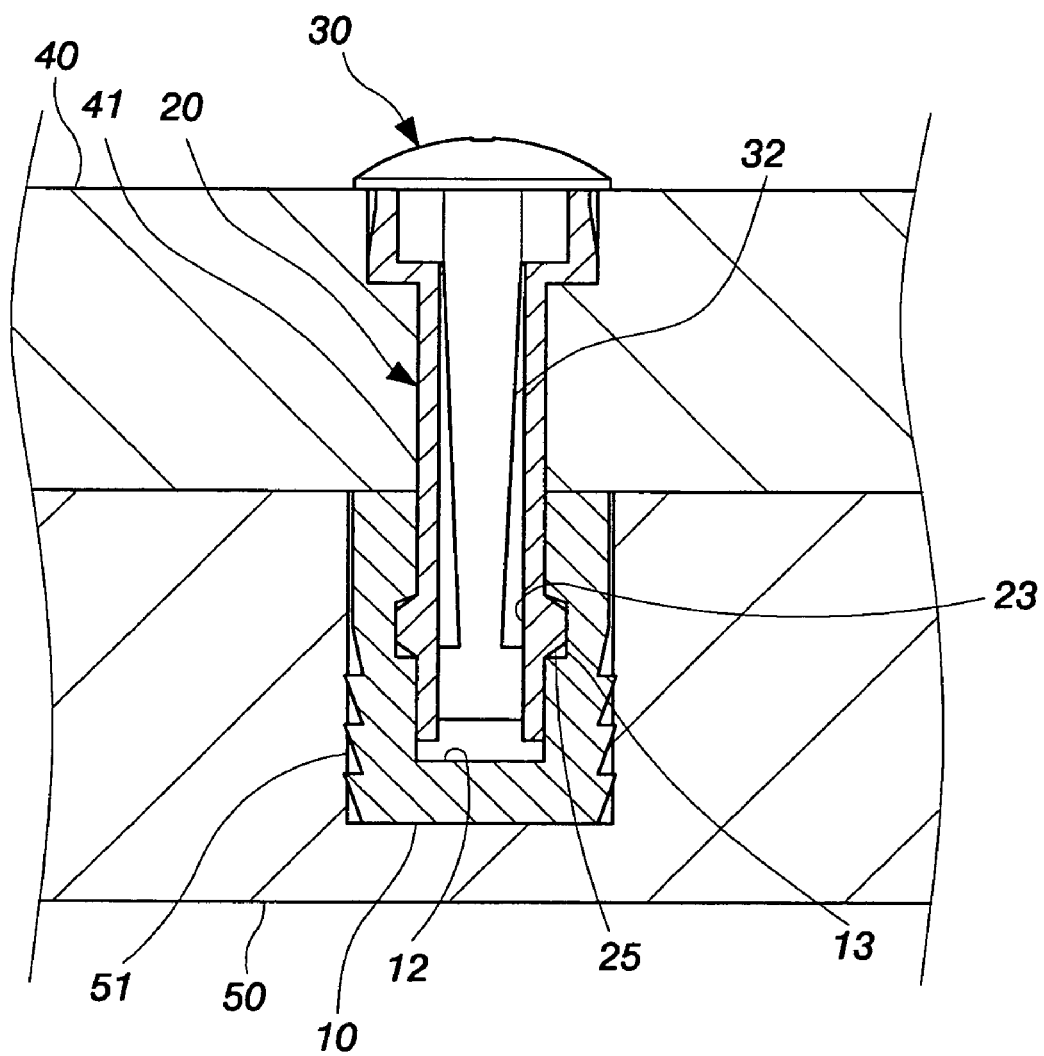
FIG. 6 is a sectional schematic view showing the structure after completion of assembling the embodiment of the present invention.

As shown in FIGS. 5 and 6, after the hollow engaging member 20 is engaged with the fixing seat 10, the protruding portion 321 of the fixing rod 30 is extended into the central passage 23 of the hollow engaging member 20. At this time, the stem 32 of the fixing rod 30 is abutted against the wall of the central passage 23 inside of the elastic positioning portion 25, so that the elastic positioning portion 25 is tightly abutted on the wall of the engaging groove 13 and are unable to be further compressed inwards; and the outer radius of the elastic positioning portion 25 is larger than the inner radius of the engaging hole 12, so that the hollow engaging member 20 is tightly engaged with the fixing seat 10 and can not be pulled upwards; this makes tight connecting among the fixing seat 10, the hollow engaging member 20 and the fixing rod 30 against dropping off; thereby the first plate 40 can be fast and completely combined with the second plate 50, i.e., the combinational commodity is fast assembled without using an auxiliary tool.

Figure 7:
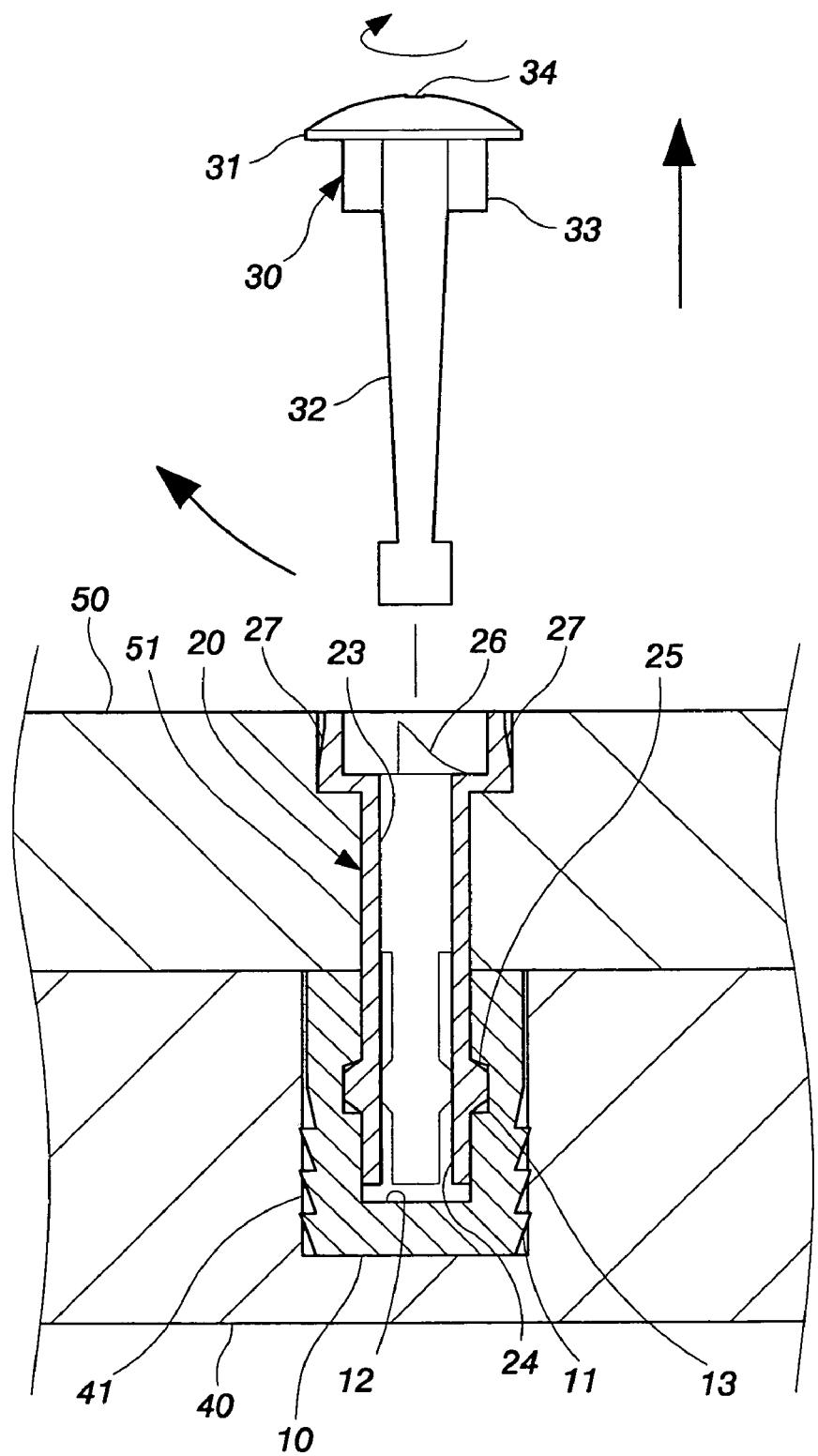
FIG. 7 is a sectional schematic view showing the action of dismantling the fixing rod from the hollow engaging member of the embodiment of the present invention.

As shown in FIGS. 1, 2 and 7, when the above assembled structure is necessary to be dismantled, the central passage 23 of the hollow engaging member 20 is provided on the lateral side of its top with at least a guiding portion 26, correspondingly, the rod head 32 of the fixing rod 30 is provided with a guiding protrusion 33; when the fixing rod 30 is rotated, the guiding protrusion 33 is raised along the guiding portion 26 to move up the fixing rod 30, thereby the protruding portion 321 of the fixing rod 30 is released from abutting on the wall of the central passage 23 inside of the elastic positioning portion 25, so that the hollow engaging member restores its original state to have the elastic positioning portion 25 elastically engaged in the engaging groove 13 of the fixing seat 10. At this time, the hollow engaging member 20 is elastically engaged with the fixing seat 10, so that the hollow engaging member 20 can be pulled upwards, the elastic positioning portion is compressed inwards to be released from the fixing seat 10, and the first plate 40 can be separated from the second plate 50.

And more, in order to make smooth of the process of dismantling, the rod head 31 is further provided with a force exerting portion 34; when in dismantling the combinational commodity, force can be exerted on the force exerting portion 34 to raise the fixing rod 30; in the drawings, the force exerting portion 34 is a tooling hole to afford force exerting with a screw driver, and in practicing, it can also be a square or hexagonal hole to afford force exerting with a different tool.

And more, the hollow engaging member 20 can be provided on the outer surface of the head 21 at least with a stop protrusion 27, when the head 21 is embedded in the through hole 51 of the second plate 50, the stop protrusion 27 can cooperate with the wall of the through hole 51 to increase the friction force between the head 21 of the hollow engaging member 20 and the through hole 51 of the second plate 50, thereby the hollow engaging member 20 can be prevented from twisting when the fixing rod 30 is dismantled.

Moreover, the connecting bottom portion 11 of the fixing seat 10 of FIG. 1 is formed from a plurality of mutual parallel peripheral annular stepped portions and can be applied to a wooden shelf, desk, chair or a kind of furniture etc.; when the fixing seat 10 is plugged in a fixing hole 41 of the first plate 40, the connecting bottom portion 11 forms a function of reversing proofing against the fixing hole 41, thereby the fixing seat 10 can be firmly combined in and with first plate 40.

Figure 8:
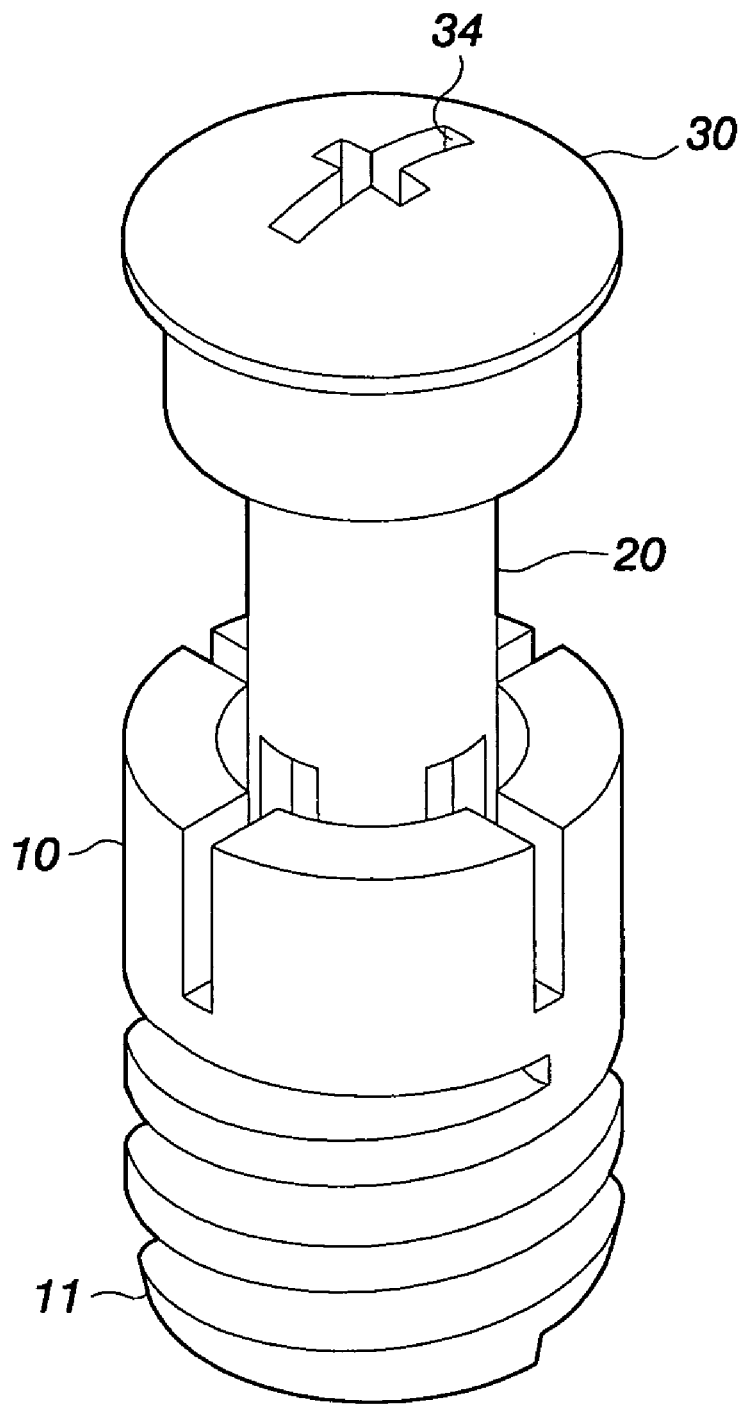
FIG. 8 is a perspective view showing the appearance of another kind of connecting portion of a fixing seat on the embodiment of the present invention.

Further in practicing, the connecting bottom portion 11 can be of the structure of an outer peripheral screw thread as is shown in FIG. 8, and the wall of the fixing hole 41 can be provided with an inner screw thread, these screw threads can be connected with each other; this is mainly applied to the first plate 40 and the fixing hole 41 that are made of metallic materials; by virtue that hardness of the metallic materials is larger, the mode of connecting between screw threads can render the fixing seat 10 to be more firmly fixed in the fixing hole 41 of the first plate 40; this is particularly suitable for applying to a combinational commodity such as a metallic shelf, desk or chair etc.

However, the embodiment stated above is only for illustrating the present invention, it will be apparent to those skilled in this art that various equivalent modifications or changes according to the idea of and without departing from the spirit of this invention shall also fall within the scope of the appended claims.

The invention claimed is:

1. A combinational commodity engaging unit engaging a first plate with a second plate of a combinational commodity, said engaging unit comprising at least:

a fixing seat embedded in said first plate and having a top portion with an engaging hole, said engaging hole being provided therein with an engaging groove of which an inner radius is larger than an inner radius of said engaging hole, wherein a bottom portion of said fixing seat is embedded in a fixing hole of said first plate, said bottom portion of said fixing seat having a connecting portion having a function of reversing proofing;

a hollow engaging member embedded in a through hole of said second plate, said hollow engaging member including a head embeddable in said through hole, a protruding shaft extending from said head to a distal end and adapted to extend through and out of said through hole, and a central passage extending through said head and said protruding shaft; wherein said protruding shaft is embedded in said engaging hole of said fixing seat and has on its outer wall a protruding elastic positioning portion spaced from said distal end having an outer radius which is larger than said inner radius of said engaging hole, said elastic positioning portion being radially compressed when inserted into said hollow engaging member and expanding to elastically engage in said engaging groove; and a fixing rod extended into said hollow engaging member, comprising a stem having an outer surface which is tapered towards a bottom end, said bottom end of said fixing rod having a protruding portion with a diameter in coincidence with an inner diameter of said central passage of said hollow engaging member; wherein when said fixing rod is extended into said central passage of said hollow engaging member, said protruding portion abuts the interior of the hollow engaging member at a location axially between said elastic positioning portion and said distal end, and is tightly abutted on an inner wall of said central passage, such that said elastic positioning portion is expanded and engaged in said engaging groove, and the outer surface of said protruding shaft abuts the interior surface of the engaging hole at said distal end radially adjacent said protruding portion.

2. The combinational commodity engaging unit as in claim 1, wherein said protruding shaft has on its outer wall a plurality of slits and thus is adapted to be compressed radially inwardly when inserted into said hollow engaging member.

3. The combinational commodity engaging unit as in claim 1, wherein said hollow engaging member is provided on an outer surface of said head with a stop protrusion to cooperate with a wall of said through hole to prevent twisting of said hollow engaging member during dismantling of said combinational commodity engaging unit.

4. The combinational commodity engaging unit as in claim 1, wherein said central passage of said hollow engaging member is provided on a lateral side of its top with a guiding portion, correspondingly, said fixing rod has a rod head that is provided thereunder with a guiding protrusion, said rod head is further provided thereon with a force exerting portion.

5. The combinational commodity engaging unit as in claim 1, wherein said central passage of said hollow engaging member is provided on a lateral side of its top with a guiding portion, and wherein, correspondingly, said fixing rod has a rod head that is provided with a guiding protrusion.

6. The combinational commodity engaging unit as in claim 5, wherein said rod head is further provided with a force exerting portion.

* * * * *